UNITED STATES PATENT OFFICE.

CARL HARRIES, OF KIEL, GERMANY, ASSIGNOR TO FARBENFABRIKEN VORM. FRIEDR. BAYER & CO., OF ELBERFELD, GERMANY, A CORPORATION OF GERMANY.

PROCESS OF PRODUCING ERYTHRENE.

1,038,359.   Specification of Letters Patent.   Patented Sept. 10, 1912.

No Drawing.   Application filed May 16, 1912.   Serial No. 697,822.

*To all whom it may concern:*

Be it known that I, CARL HARRIES, doctor of philosophy, professor of chemistry, citizen of the German Empire, residing at Kiel, Germany, have invented new and useful Improvements in Processes of Producing Erythrene, of which the following is a specification.

I have found that the technically valuable hydrocarbon erythrene can be obtained in a simple manner by treating a butylene halogenid with an oxy compound of a metal of metallobasic character, e. g. soda lime, calcium hydroxid, magnesia, carbonates. For this purpose butylene halogenid vapors are passed over the heated oxids, etc.

In order to illustrate the new process more fully the following example is given, the parts being by weight:—In a suitable distilling apparatus 1000 parts of soda lime are dried by heating while introducing $CO_2$. Subsequently the temperature in the apparatus is raised to about 600° C. and at the same time 500 parts of butylene bromid (2.3-dibromo-2-butylene):

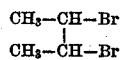

are slowly added to the heated mass. The unchanged parent material returns into the apparatus while the gases are freed from liquid hydrocarbons by efficient cooling. By physical or chemical methods the erythrene can be isolated in the well known manner.

I claim:—

1. The herein described process for producing erythrene, which process consists in treating a butylene halogenid with an oxy compound of a metal of metallobasic character and in separating erythrene from the gaseous product thus produced, substantially as described.

2. The herein described process for producing erythrene, which process consists in treating a butylene halogenid with soda lime and in separating erythrene from the gaseous mixtures thus produced, substantially as described.

3. The herein described process for producing erythrene, which process consists in treating a butylene bromid with an oxy compound of a metal of metallobasic character and in separating erythrene from the gaseous mixtures thus produced, substantially as described.

4. The herein described process for producing erythrene, which process consists in treating butylene bromid with soda lime and in separating erythrene from the gaseous mixtures thus produced, substantially as described.

In testimony whereof I have hereunto set my hand in the presence of two subscribing witnesses.

CARL HARRIES.

Witnesses:
JULIUS RÖPKE,
MAX KALWA.